W. L. PAUL.
ENGINE GANG PLOW.
APPLICATION FILED DEC. 22, 1916.
1,377,025.
Patented May 3, 1921.
3 SHEETS—SHEET 1.
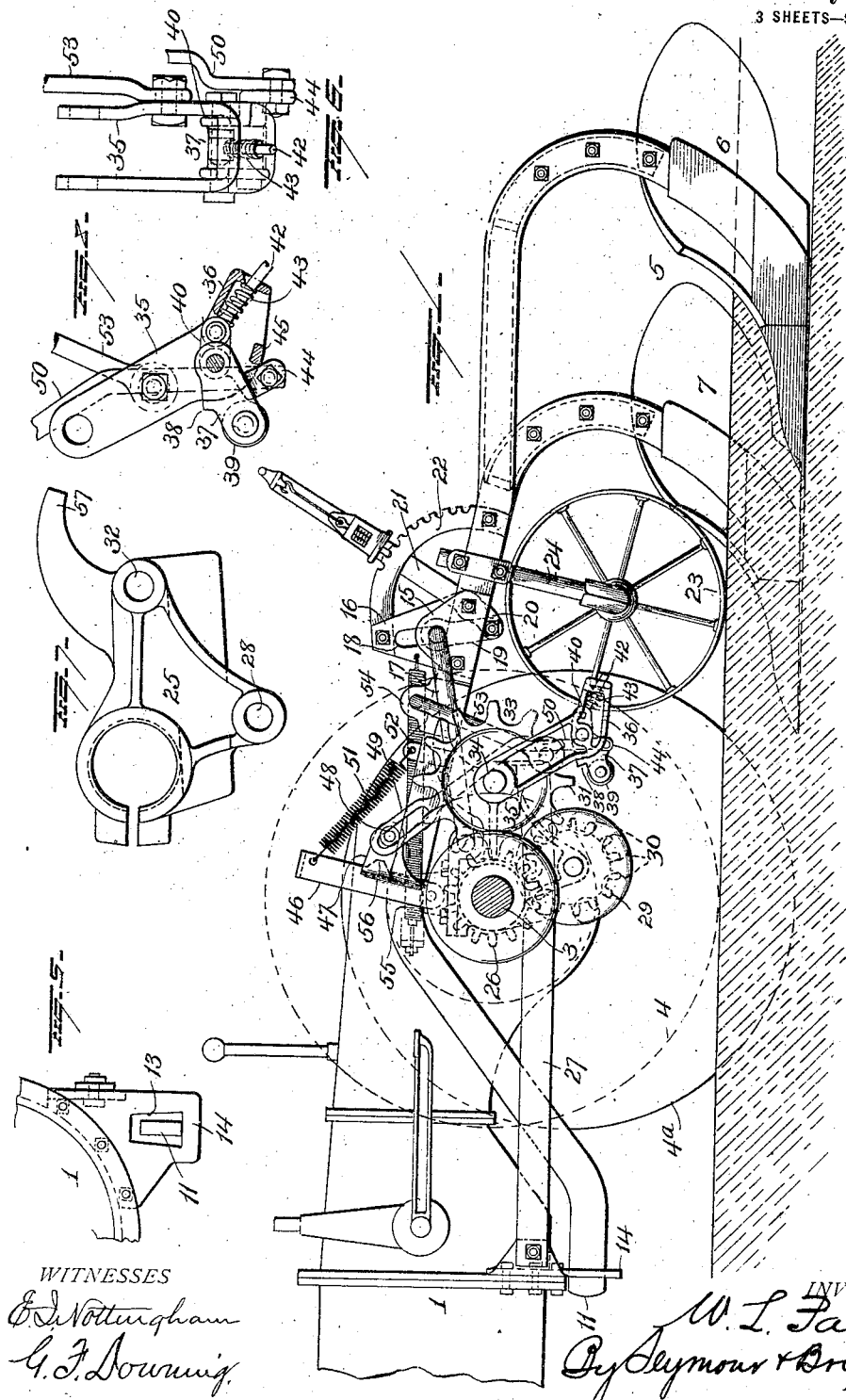
WITNESSES
INVENTOR
W. L. Paul
By Seymour & Bright
Attorneys W. L. PAUL.
ENGINE GANG PLOW.
APPLICATION FILED DEC. 22, 1916.
1,377,025.
Patented May 3, 1921.
3 SHEETS—SHEET 2.
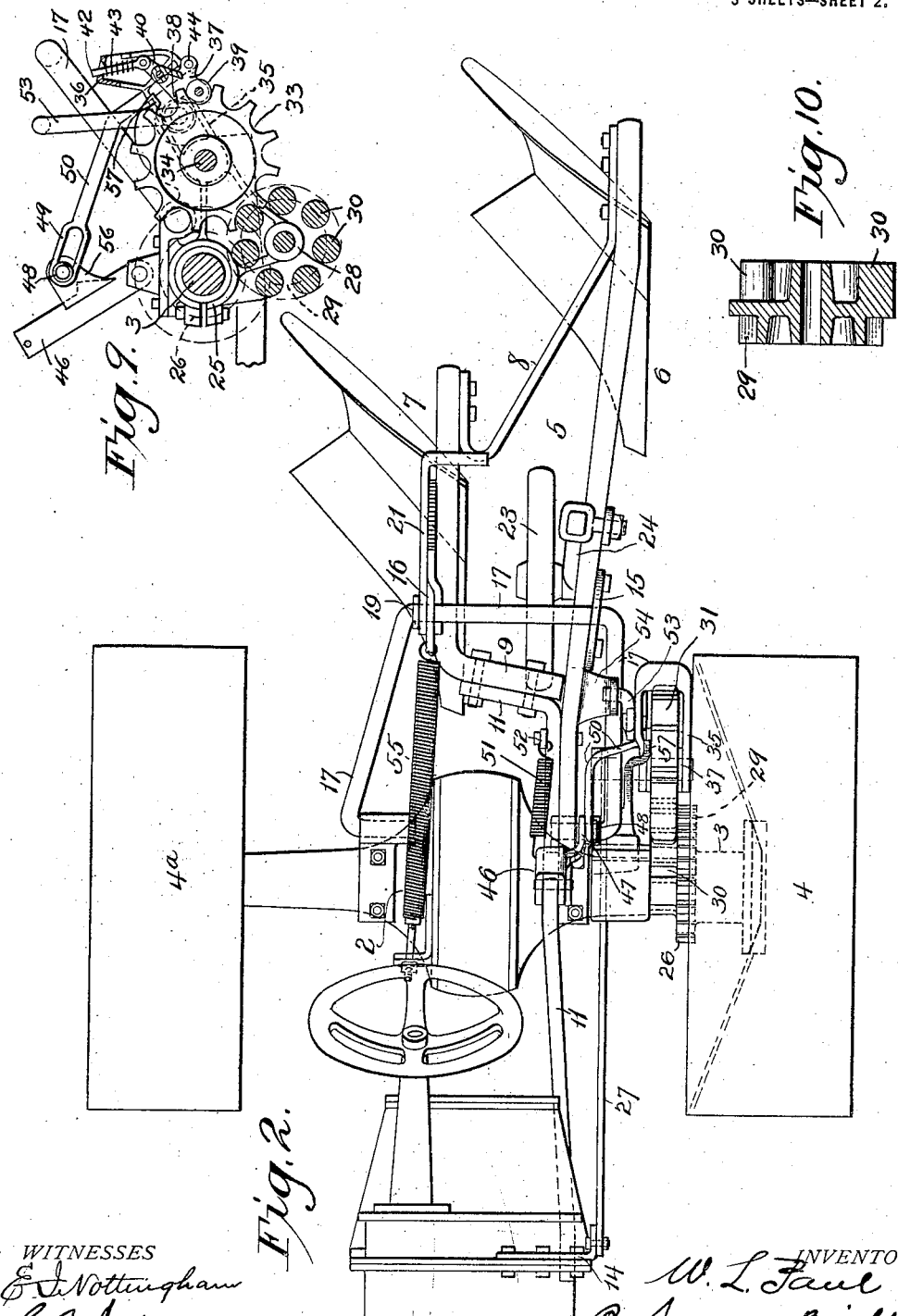
WITNESSES
E. J. Nottingham
G. F. Downing
INVENTOR
W. L. Paul
By Seymour & Bright
Attorneys

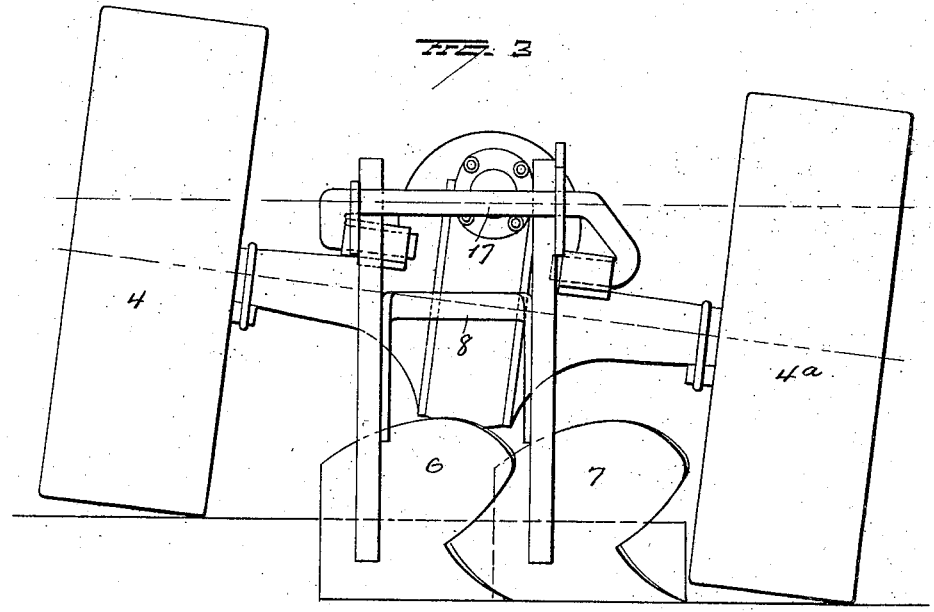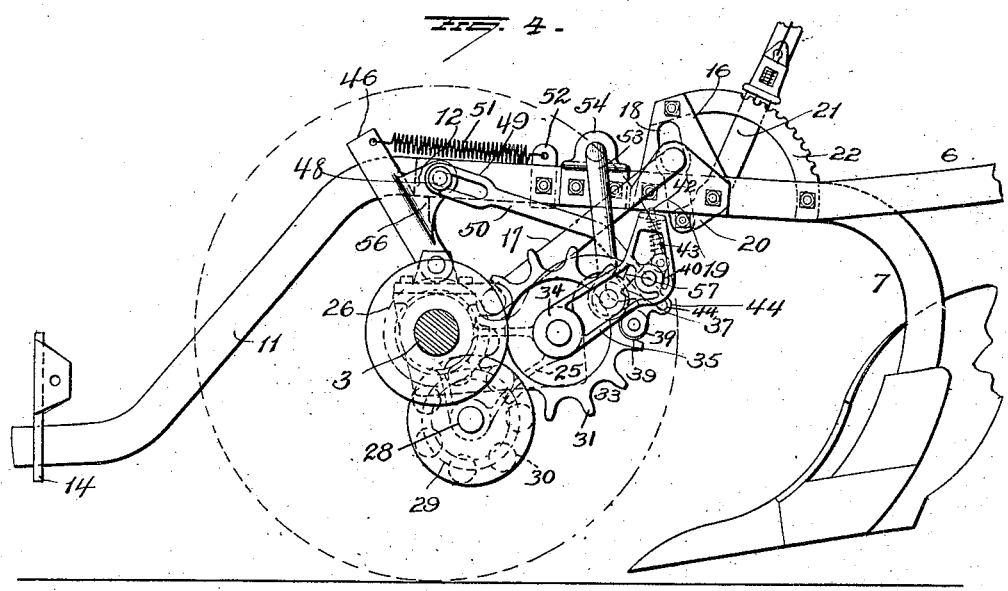

UNITED STATES PATENT OFFICE.

WILLIAM L. PAUL, OF SAN FRANCISCO, CALIFORNIA, ASSIGNOR TO OLIVER CHILLED PLOW WORKS, OF SOUTH BEND, INDIANA.

ENGINE GANG-PLOW.

1,377,025.　　　　　Specification of Letters Patent.　　Patented May 3, 1921.

Application filed December 22, 1916. Serial No. 138,317.

*To all whom it may concern:*

Be it known that I, WILLIAM L. PAUL, a citizen of the United States, and a resident of San Francisco, in the county of San Francisco and State of California, have invented certain new and useful Improvements in Engine Gang-Plows; and I do hereby declare the following to be a full, clear, and exact description of the invention, such as will enable others skilled in the art to which it appertains to make and use the same.

This invention relates to improvement in plows and more particularly to an engine gang plow structure embodying power lift mechanism,—one object of the invention being to provide simple and efficient power mechanism operated from a wheel of a draft tractor for raising a plow gang, particularly such as is adapted to trail behind the tractor and having a forward beam extension movably supported by the tractor forwardly of its rear axle.

A further object is to provide simple and efficient means for controlling the operation of the power lift mechanism.

With these and other objects in view, the invention consists in certain novel features of construction and combinations of parts as hereinafter set forth and pointed out in the claims.

In the accompanying drawings; Figure 1 is a side elevation of an engine gang plow structure embodying my invention with the plow gang in working position and the front end of the tractor omitted; Fig. 2 is a plan view; Fig. 3 is a diagrammatic rear view; Fig. 4 is a side elevation partly in section and partly broken away showing the positions of the parts when the plow is in raised position, and Figs. 5. 6, 7, 8 are detail views, Fig. 9 is a view partly in section and partly in elevation showing the gearing and parts which coöperate therewith, and Fig. 10 is a sectional view of the gear structure 29—30.

1 represents a tractor and 2 the mounting for the rear axle 3 which receives the wheels 4, 4ª of the tractor.

In the present instance, I have shown a plow gang 5 comprising two plow units 6, 7 (although a greater number of plow units may be employed, if desired) and the rear ends of these plow units may be rigidly connected by means of a brace 8. The beam of the plow unit 6 may extend forwardly over the rear axle of the tractor while the beam of the plow unit 7 may be provided at its forward end with a lateral arm 9 projecting toward the beam of the plow unit 6, and to said lateral arm, an arm 10 at the rear end of a beam-extension 11 is securely bolted. The beam 11 is also bolted to the beam of the plow unit 6 and extends forwardly and downwardly from the same. The forward end of the beam of the plow unit 6 where the same lies against the rear portion of the beam extension 11 over the axle mounting 2, forms a shoulder 12 (see Fig. 4), for a purpose which will be hereinafter explained. The beam 11 constitutes a rigid beam extension for the gang and its forward end is made to project loosely through an opening 13 in a bracket 14 near the forward portion of the tractor and near one side thereof, thus effecting a guiding and supporting connection for the plow gang to the tractor at a point well in advance of the rear axle of the tractor.

Brackets 15, 16 are secured to and project upwardly from the beams of the respective plow units somewhat in rear of their connected forward ends and serve as connecting means for the rear cross bar of a bail 17 with the plow gang,—the side members of said bail extending downwardly and forwardly from the brackets 15, 16 and pivotally connected at their forward ends to the rear axle mounting 2 of the tractor. The opening in the bracket 16 for the passage of the bail 17 is made elongated as shown at 18, and adjacent to said bracket a link 19 is loosely connected with the bail, the lower end of said link being pivotally connected with an arm 20 of a lever 21 pivoted to the beam of the plow unit 7. The lever 21 is provided with a suitable detent to engage a toothed segment 22. It will be apparent that as the bail 17 extends across the plow units and is connected with them, it will act as a steadying means for the gang, and also that said bail constitutes a draft device for the gang while the forward end of the latter is guided and supported by the connection of the beam extension 11 to the tractor in advance of the rear axle of the latter. It is also evident that the plow gang may be leveled by manipulation of the lever 21.

In engine gang plows of the type to which my invention relates, the wheels on one side of the tractor run in the furrow and hence the tractor inclines laterally as shown in Fig. 3. In order therefore, that the plow gang may be kept level with the land, the bail is so constructed that one end of its cross bar will be higher than the other end when the axle of the tractor is horizontal, so that when the plow is at work and the tractor is inclined laterally, the cross bar of the bail shall be horizontal as shown in Fig. 3.

It will be observed that the plow gang has a "floating" characteristic and in order that the plow bases may be caused to plow at uniform depths regardless of the contour of the ground, I employ a gage wheel 23 located between the points of the plow bases—the standard 24 for this gage wheel being adjustably attached to the plow gang rearwardly of the connection of the bail with the latter.

A bracket 25 is attached to the rear axle mounting of the tractor, and in proximity thereto a gear 26 is secured to the hub of the tractor wheel 4. The bracket projects rearwardly from its connection with the tractor and is prevented from turning by means of a bar 27—one end of which latter may enter an opening in the bracket and the other end is secured to the forward portion of the tractor as shown in Figs. 1 and 2.

The bracket 25 affords a bearing at 28 for an idle gear 29 which receives motion from the gear 26, and the idle gear 29 carries or is made with a gear 30 having widely separated teeth to mesh with and transmit motion to a larger gear or notched wheel 31 mounted at 32 on the bracket 25. The gear or notched wheel 31 is made with widely separated teeth which form pockets 33 between them for a purpose hereinafter explained. The gear 31 is mounted on a stub 34 carried by the bracket 25 at 32 and rotates continuously during the travel of the plow. A bifurcated lever 35 embraces the gear 31 and is pivotally mounted at its upper end on the stub 34 which forms the axis of rotation of said gear 31. The lever 35 normally depends in a somewhat rearwardly inclined direction and at its lower end is made with a rearwardly projecting hollow arm 36. At or near the juncture of this arm to the lever, a dog 37 is pivotally mounted and projects forwardly from the lever. The dog 37 is provided between its ends with a shoulder 38 for a purpose hereinafter explained and at the free end of said dog, a roller 39 is mounted—said roller being of proper size to enter any one of the pockets 33 of the gear 31. The dog 37 is provided with a rearwardly projecting arm 40 with which one end of a rod 42 is connected, said rod passing freely through an opening in the end of the lever arm 36. A spring 43 encircles the rod 42 and bears at its respective ends against the lower arm 36 and the arm 40 on the dog—said spring thus serving to retain the dog either in the normal position shown in Figs. 1 and 8 or in the position shown in Fig 4 with the roller 39 in mesh with the gear 31. A lug 44 depends from an intermediate portion of the dog 37 and, by engagement with a stop 45 on the lever arm, serves to limit the movement of said dog and retain it in its proper normal position with respect to the gear 31.

A foot lever 46 is mounted on the rear axle mounting 2 of the tractor and is provided between its ends with a rearwardly projecting arm 47 provided with a pin 48. This pin receives the slotted upper end 49 of a rod or link 50, the lower end of which is connected with the lug 44 of the dog 37 for operating the latter to move the same into mesh with the gear 31 when the foot lever 46 is moved forwardly. The foot lever 46 is retained in and returned to its normal position by the action of a spring 51 attached at one end to said lever and at the other end to an arm 52 on the plow gang.

The lever 35 is connected with the plow gang by means of a link 53—one end of which is pivotally connected with said lever and the other end is pivotally mounted in a bracket 54 secured to the plow gang.

A balancing spring 55 may be connected at one end with the plow gang and at the other end with the tractor.

As before stated, the gear 31 rotates continuously during the travel of the plow. Should the operator press the foot lever 46 forwardly, motion will be imparted through the medium of the rod or link 50 to the dog 37 causing the roller at the free end of the latter to enter one of the pockets 33 of said gear thus connecting the lever 35 with the latter. As the gear continues to turn, the lever 35 will be raised and motion will be imparted, through the medium of the link 53, to the plow gang and raise the latter, the bracket 14 in which the beam extension 11 is mounted constituting the fulcrum for the plow gang. When the gang approaches the limit of its upward movement, the shoulder 12 (Fig. 4) on the plow gang will ride over and rest upon a shoulder 56 on the foot lever 46 and thus the plow gang will be held in its elevated position. At approximately the same time that the plow gang thus becomes propped in its elevated position, the shoulder 38 on the dog 37 will engage a finger 57 which projects rearwardly from the bracket 25, and thus said dog will be moved out of mesh with the gear 31.

When it is desired to lower the plow gang, the operator will press the foot lever 46 forwardly, thus moving the shoulder 56 thereon away from the shoulder 12 on the plow gang, permitting the latter to descend by gravity and the parts to move from the positions shown in Fig. 4 to normal working positions as shown in Fig. 1.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. The combination with a wheeled draft member, a plow beam connected with said wheeled draft member forwardly of the rear axle of the latter, and a member pivotally connected with the wheeled draft member and with an intermediate portion of the plow beam, of a lifting lever carried by the wheeled draft member, a member connected with said lifting lever and with the pivoted member in proximity to the connection of the latter with the plow beam, gearing between said lifting lever and a wheel of the wheeled draft member, and means for connecting said lifting lever with said gearing.

2. The combination with a wheeled draft member, a plow beam, and a bail pivoted to the wheeled draft member and pivotally connected with an intermediate part of the plow beam, of a notched wheel carried by the wheeled draft member, gearing connecting said notched wheel with a wheel of the wheeled draft member, a lifting lever carried by the wheeled draft member, a link connected with said lifting lever and connecting the same with the plow beam in proximity to the connection of the bail therewith, a dog carried by said lifting lever and coöperable with said notched wheel, and means for controlling the operation of said dog.

3. The combination with a wheeled draft member and a plow connected therewith, of a notched wheel carried by the wheeled member, gearing connecting said notched wheel with a wheel of the wheeled member, a pivoted lever carried by the wheeled member and connected with the plow, a dog carried by said lever, an operating lever pivoted to the wheeled member and having a shoulder, a connection between said operating lever and said dog for moving the latter into engagement with said notched wheel for raising the plow into supporting engagement with the shoulder on the operating lever, a spring for forcing said operating lever forwardly, and means for releasing said dog from the notched wheel when the plow is raised.

4. The combination with a wheeled draft member, a plow connected therewith, and a bracket secured to the wheeled member, of a notched wheel mounted on the said bracket, gearing between said notched wheel and a wheel of the wheeled member, a lever having a mounting concentric with that of the notched wheel, a dog mounted on said lever, an operating lever mounted on the wheeled member, a link connecting said operating lever with the dog for moving the latter into mesh with the notched wheel to raise the plow, a finger on the bracket to move said dog out of engagement with the notched wheel, and a spring for retaining the dog in either of the positions to which it may be moved.

In testimony whereof I have signed this specification in the presence of two subscribing witnesses.

WILLIAM L. PAUL.

Witnesses:
  EDWIN NICAR,
  CHARLES A. WEBSTER.